United States Patent [19]

Akagiri et al.

[11] Patent Number: 5,241,603
[45] Date of Patent: Aug. 31, 1993

[54] DIGITAL SIGNAL ENCODING APPARATUS

[75] Inventors: Kenzo Akagiri; Kyoya Tsutsui; Yoshihito Fujiwara, all of Kanagawa, Japan

[73] Assignee: Sony Corporation, Tokyo, Japan

[21] Appl. No.: 703,830

[22] Filed: May 21, 1991

[30] Foreign Application Priority Data

May 25, 1990 [JP] Japan .................... 2-133980

[51] Int. Cl.$^5$ .............................. G10L 5/00
[52] U.S. Cl. ........................... 381/37; 381/30
[58] Field of Search ................. 381/29-37; 395/2

[56] References Cited

U.S. PATENT DOCUMENTS 4,896,362 1/1990 Veldhuis ................. 381/37
4,972,484 11/1990 Theile et al. .
5,105,463 4/1992 Veldhuis ................. 381/30

OTHER PUBLICATIONS

Rundfunktechnische Mitteilungen vol. 33, No. 4, Aug. 1989, Norderstedt DE pp. 149–154.
WO-A-8-804 117 (Bayerische Rundfunkwerbung p. 4, line 29–p. 5, line 1, p. 10, line 25–p. 11, line 11, p. 15, line 1–line 15, p. 34, line 23–p. 35, line 17.
Bell System Technical Journal vol. 56, No 5, May 1977, New York US pp. 747–769.

Primary Examiner—Emanuel S. Kemeny
Attorney, Agent, or Firm—William S. Frommer; Alvin Sinderbrand

[57] ABSTRACT

The present invention relates to a digital signal encoding apparatus in which an input digital signal has its frequency range divided into a number of frequency bands so that the bandwidths are broader at higher frequencies. A first allowable noise level based on the energy levels in the respective bands, and a second allowable noise level based on the energies of the signals temporally adjacent to the signals of a frequency band under consideration, are set. Signal components of each frequency band are quantized with a number of bits corresponding to a difference between an output synthesized from the first and second noise levels and the energy level of each frequency band. In this manner, the bit rate may be lowered while deterioration in the sound quality is minimized.

12 Claims, 6 Drawing Sheets

DIGITAL SIGNAL ENCODING APPARATUS

BACKGROUND OF THE INVENTION

1. Field of the Invention

This invention relates to an apparatus for encoding an input digital signal.

2. Description of the Prior Art

For high efficiency encoding of audio or voice signals, a known encoding technique employs adaptive bit allocation in which the input signals, such as audio or voice signals, are divided on the time axis or on the frequency axis into a plurality of channels and the numbers of the bits are adaptively allocated for the respective channels. Among the techniques for encoding audio signals by adaptive bit allocation are a sub-band coding (SBC) technique, in which the audio signals on the time axis are divided into a plurality of frequency bands for encoding, an adaptive transform coding (ATC) technique in which signals on the time axis are converted into signals on the frequency axis by orthogonal transform and divided into a plurality of frequency bands in each of which adaptive signal encoding is performed, and a so-called adaptive bit coding (APC-AB) technique, in which the sub-band encoding and adaptive transform encoding techniques are combined such that the signals on the time axis are divided into frequency bands and the signals of the respective bands are converted into baseband signals and predictively encoded by nth order linear predictive analyses, where n is an integer equal to two or more.

In the field of high efficiency encoding, techniques in which the so-called masking characteristics of the human auditory sense are taken into account, have been adopted extensively. The masking effect refers to a phenomenon in which a signal is masked by another signal and thereby becomes inaudible. This masking effect is classified into the masking of audio signals along the time axis and the masking of signals on the frequency axis.

The masking of audio signals on the frequency axis is now explained. In the case of a sine wave $W_S$ having a frequency $f_s$, the masking spectrum or masking curve MS, representing the masking effect by the human auditory sense, is as shown in FIG. 1. The illustrated masking spectrum MS signifies that the area indicated by hatched lines is masked. Thus the noise within the masking spectrum MS, if any, becomes inaudible, so that, in the actual audio signal, any noise within the masking spectrum MS is allowable. Thus the allowable noise level in the case of the sine wave $W_S$ is below the level shown at j in FIG. 1. Also the masking effect is maximum at the frequency $f_s$ of the sine wave $W_S$ and becomes lower the more the frequency differs from the frequency $f_s$ of the sine wave $W_S$.

The masking of audio signals along the time axis is classified into temporal masking and concurrent masking. Concurrent masking means an effect in which a smaller sound (or noise) generated simultaneously with a larger sound is masked by the larger sound and becomes inaudible. Temporal masking means an effect in which, as shown in FIG. 2, the smaller sound or noise temporally before and after a larger sound (a high level signal part C in the figure) is masked by the larger sound and becomes inaudible. With temporal masking, masking of the sound temporally after the larger sound is termed forward masking and masking of the sound temporally before the larger sound is termed backward masking. In temporal masking, the effect of forward masking FM in FIG. 2 persists for a long time (of the order of 100 msec, for example), while that of backward masking BM has a shorter duration (of the order of 5 msec, for example), on account of the characteristics of the human auditory sense. The masking level or masking quantity is of the order of 20 dB and 30 dB with forward masking and with backward masking, respectively.

Meanwhile, with the above described high efficiency encoding techniques, it is desired to achieve a further increase in the bit compression rate L or the amount of bit reduction. However, in such techniques bit compression is achieved by taking advantage only of either the masking effect on the frequency axis or the masking effect along the time axis. That is, both masking effects have not been utilized simultaneously.

OBJECTS AND SUMMARY OF THE INVENTION

It is therefore an object of the present invention to provide a digital signal encoding apparatus in which both the masking effect of signals on frequency axis and the that of signals along the time axis are utilized effectively to achieve a further bit reduction or to lower the bit rate.

It is another object of the present invention to provide a digital signal encoding apparatus in which deterioration in sound quality may be minimized despite a low bit rate.

For accomplishing the above objects, the present invention provides a digital signal encoding apparatus for encoding an input digital signal comprising dividing means to which said input digital signal is supplied, said dividing means being adapted for dividing the frequency range of said input digital signal into a plurality of frequency bands, first noise level setting means for setting a first allowable noise level of each frequency band based on the energy of each frequency band, second noise level setting means for setting a second allowable noise level of each frequency band based on the energies of the signals temporally adjacent to the signals of the frequency band under consideration for quantization, synthesizing means for synthesizing said first and second allowable noise levels and means for quantizing signal components of each frequency band with a number of bits corresponding to the level of the difference between the energy of each frequency band and the output of said synthesizing means.

According to the present invention, an allowable noise level which takes into account the masking effect of signals on the frequency axis is set by first noise level setting means for the signal portions within the frequency band under consideration for quantization, while another allowable noise level which takes into account the masking effect on signals temporally adjacent to the signal portions within the frequency band under consideration is set by second noise level setting means for the same frequency band.

With the digital signal encoding apparatus of the present invention, the frequency range of the input digital signal is divided into a plurality of frequency bands so that the bandwidth of the frequency bands of including higher frequencies is broader. The first allowable noise level is set from one frequency band to another on the basis of the energy of each frequency band, while the second allowable noise level is set on the basis of the energies of the signals temporally adjacent to the signals of the band which is under consideration for quantization. The signal components of each frequency band are quantized using a number of bits corresponding to the level of the difference between a sum of the first and second allowable noise levels and the energy of each frequency band. In this manner, both the masking effect for the signals of the frequency band under consideration on the frequency axis and the masking effect for the signals along the time axis may be utilized effectively for increasing the degree of bit reduction or lowering the bit rate while minimizing deterioration of the sound quality even though the number of bits is reduced.

DESCRIPTION OF THE PREFERRED EMBODIMENTS

By referring to the accompanying drawings, certain illustrative embodiments of the present invention will be explained in detail.

Figure 3:
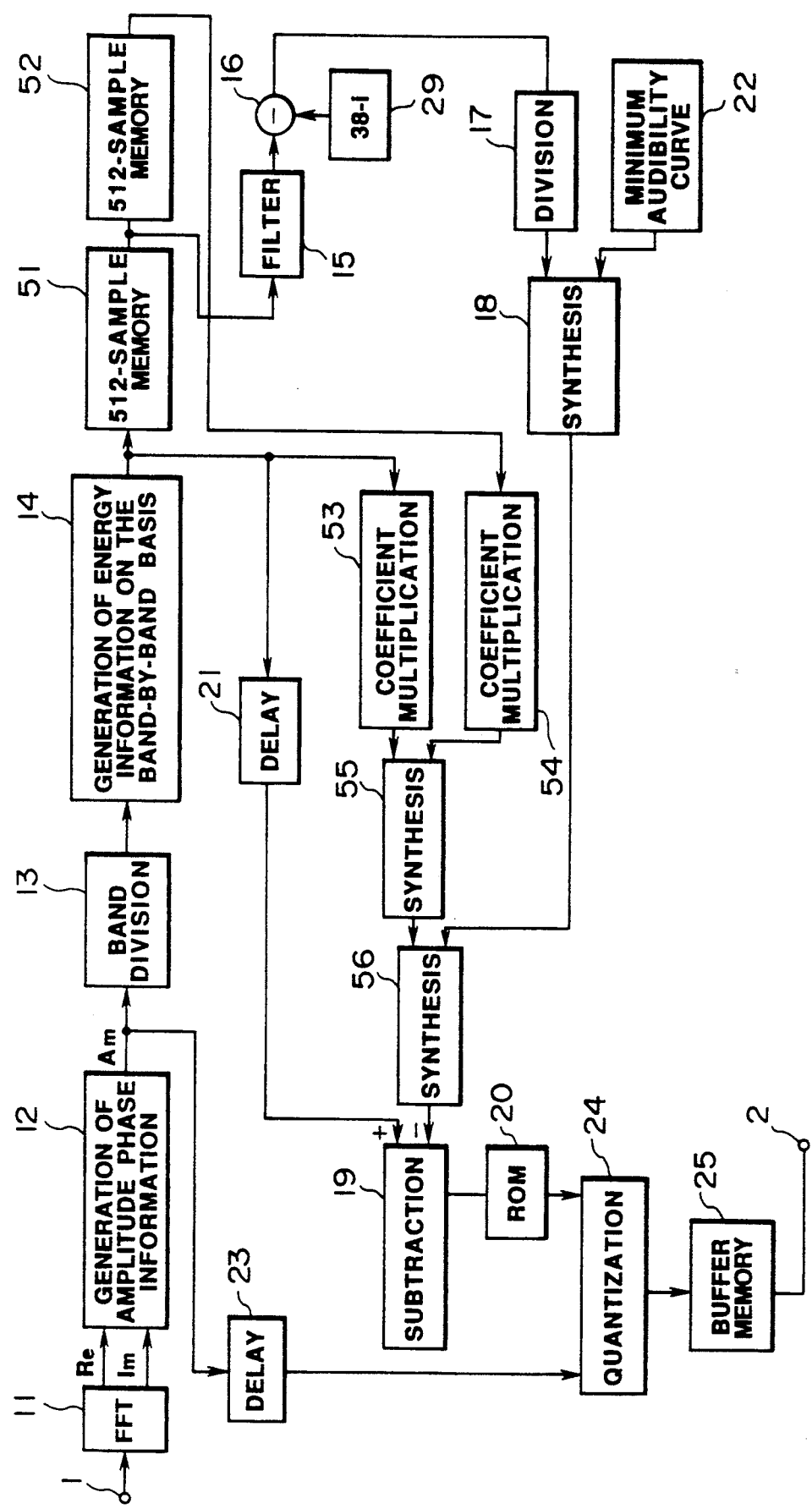
FIG. 3 is a block circuit diagram showing the construction of a digital signal encoding apparatus according to an embodiment of the present invention.

Referring to FIG. 3, a digital signal encoding apparatus according to the present invention includes a band-dividing circuit 13, a sum detection circuit 14, a filter 15, a subtraction circuit 16, a division circuit 17 and a synthesizing circuit 18, operating conjointly as a first noise level setting means for dividing input digital signals into a plurality of frequency bands whose bandwidths are broader at higher frequencies, and for setting a first allowable noise level on a band-by-band basis based on the energy of each band. The digital signal encoding apparatus also includes memories 51 and 52, coefficient multiplication units 53 and 54 and a synthesizing circuit 55, operating conjointly as a second noise level setting means for setting a second allowable noise level based on the energies of signals temporally adjacent to the signals of a frequency under consideration for quantization. The signal encoding apparatus further includes a synthesizing circuit 56 as synthesizing means for synthesizing the allowable output noise levels of the first and second noise level setting means, and a quantization circuit 24 for quantizing signal components of each frequency band with the number of bits corresponding to a level of the difference between the energy of each frequency band and the output from the synthesizing circuit 56. In the present apparatus, the first allowable noise level which takes into account the masking effect on the frequency axis and a minimum audibility curve (as described below) is set by the first noise level setting means for the signal portions in the frequency band under consideration for quantization, while the second allowable noise level which takes into account the masking of signals temporally adjacent to the signals in the frequency band under consideration is set by the second noise level setting means for the same frequency band under consideration. The quantization output from the quantization circuit 24 is output via a buffer memory 25 at an output terminal 2 of the present digital signal encoding apparatus.

It is noted that, in the present apparatus, shown in FIG. 3, an adaptive transform encoding (ATC) is employed, in which audio signals, for example, are processed by FFT (fast Fourier transform) for converting the signals on the time axis into corresponding signals on the frequency axis, and the resulting signals on the frequency axis are encoded, or re-quantized. More specifically, referring to FIG. 3, the audio signals, which are the signals on the time axis, are supplied to an input terminal 1 and thence transmitted to an FFT circuit 11. In the FFT circuit 11, audio signals on the time axis are converted at a predetermined time interval, for example, at every 512 samples, into signals on the frequency axis, for producing FFT coefficients each consisting of a real number component Re and an imaginary number component Im. These FFT coefficients are transmitted to an amplitude phase information generating circuit 12, where an amplitude value Am and a phase value are produced from the real number component Re and the imaginary number component Im, with the amplitude value Am being entered by the present apparatus as the input digital signal. It is noted that the human auditory sense in general is sensitive to the amplitude of the power in the frequency domain, even though it is rather insensitive to the phase. With this in view, only the amplitude value Am is obtained from the output of the amplitude phase information generating circuit 12 as the above mentioned input digital signal.

Figure 4:
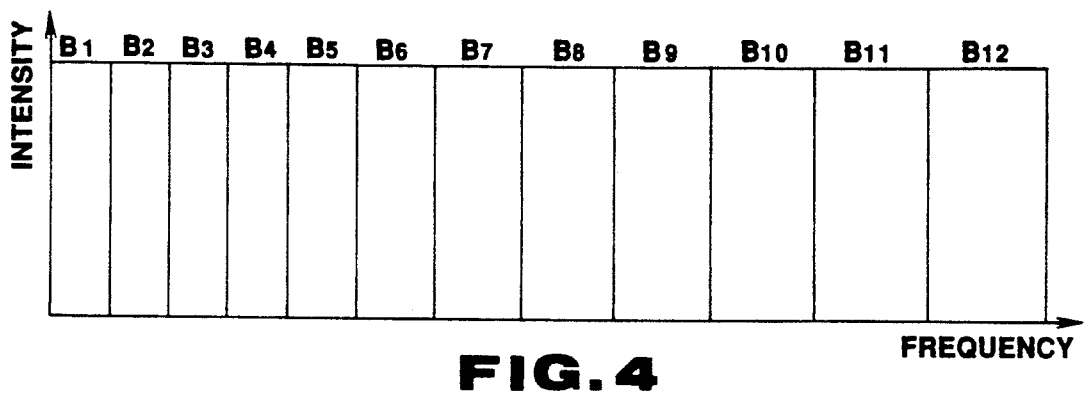
FIG. 4 is a chart for illustrating critical bands for dividing an input digital signal along the frequency axis.

An input digital signal representing the amplitude value Am thus produced is transmitted to the band-dividing circuit 13, where the input digital signal, expressed as the amplitude value Am, is divided into, for example, so-called critical bands. The critical bands take human auditory characteristics or frequency-analyzing capability into account. Thus the frequency range of 0 to 24 kHz is divided into 24 frequency bands such that the bandwidths of the bands are broader in the direction of the higher frequency bands. It is noted that the characteristics of the human auditory sense are like those of a group of bandpass filters, with the frequency bands as divided by the filters being termed "critical bands" which are shown in FIG. 4. In this figure, the number of critical bands is 12 and the bands are termed $B_1$ to $B_{12}$.

The amplitude values Am for the critical bands, such as 24 critical bands, obtained at the band-dividing circuit 13, are transmitted to the sum detection circuit 14, where the energies or spectral intensities of each band are found by taking the sum of the amplitude values in each band (the peak value or the mean value of the amplitude values Am or the energy sum in each band). The outputs of the sum detection circuit 14, that is, the spectrum of the sums of the amplitude values in the bands, are generally termed the Burke spectrum, the values of which are shown for example in FIG. 5.

Figure 5:
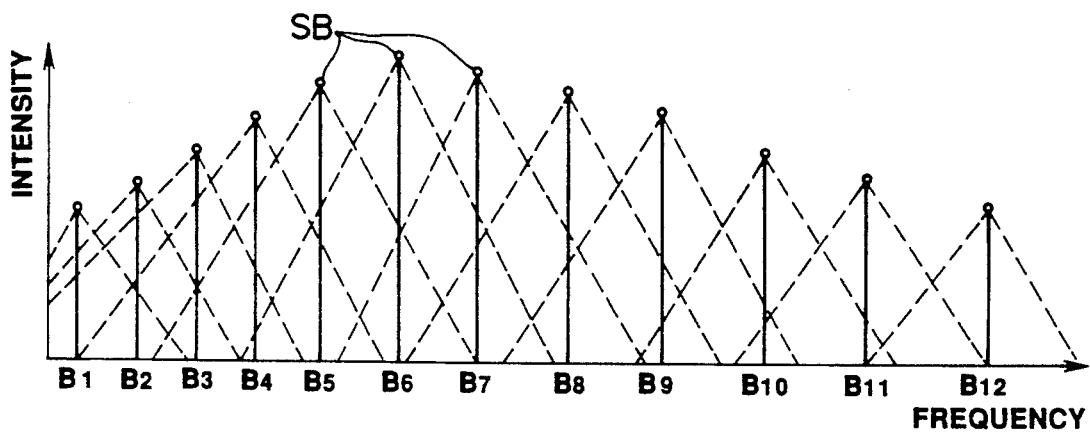
FIG. 5 is a chart for illustrating the Burke spectrum.
Figure 6:
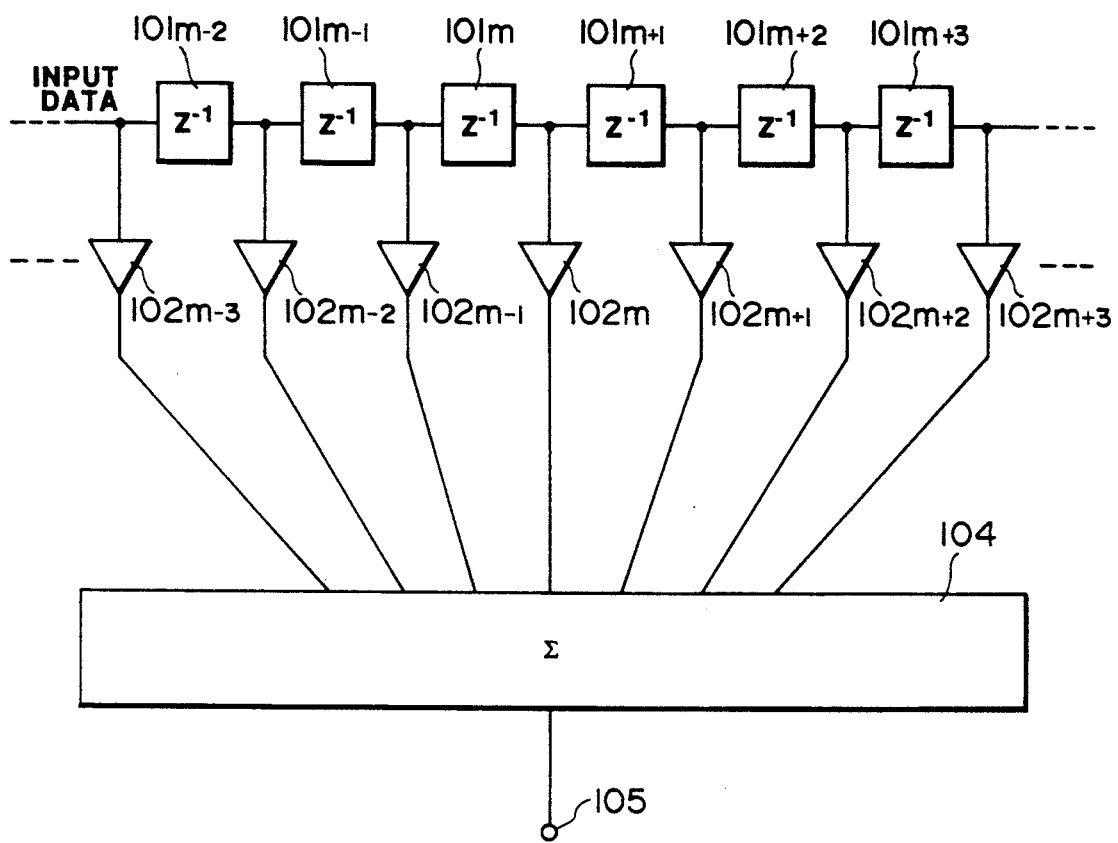
FIG. 6 is a circuit diagram showing a filter circuit of the FIG. 3 embodiment.

For taking the effect of the Burke spectrum on masking into account, a predetermined weighting function is convolved on the Burke spectrum (convolution). To this effect, the outputs of the sum detection circuit 14, that is the values of the Burke spectrum SB, are transmitted to a filter circuit 15 by means of a memory 51, which reads and/or writes the outputs of the sum detection circuit 14 each consisting of, for example, 512 samples. With reference to FIG. 6, the filter circuit 15 is constituted by delay ($Z^{-1}$) elements $101_{m-2}$ to $101_{m+3}$ for sequentially delaying the input data, multiplication units $102_{m-3}$ to $102_{m+3}$ for multiplying the outputs from the delay elements by filter coefficients (weighting functions), and a summation circuit 104. More specifically, the outputs of the delay elements are multiplied at the multiplication units $102_{m-3}$, to $102_{m+3}$ by, for example, filter coefficients 0.0000086, 0.0019, 0.15, 1, 0.4, 0.06 and 0.007, respectively, by way of performing a convolution of the Burke spectrum SB. By this convolution, the sum of the effects from the adjacent values of the Burke spectrum on the values of the Burke spectrum under consideration, as shown by broken lines in FIG. 5, is found as the outputs from the summation circuit 104, and the results of convolution are provided at output terminal 105.

Meanwhile, if a level $\alpha$, corresponding to the first allowable noise level used for calculating the masking spectrum (allowable noise spectrum) of the Burke spectrum SB, is low, the masking spectrum or masking curve with respect to signals on the frequency axis is also low, so that it becomes necessary to increase the number of bits allocated for quantization by quantization circuit 24. Conversely, if the level $\alpha$ is higher, the masking spectrum is higher, so that it becomes possible to reduce the number of bits allocated for quantization. It is noted that the level $\alpha$ is a noise level which will prove to be the above mentioned first allowable noise level for each critical band upon deconvolution which will be explained subsequently. In general, the spectral intensities or energies of the audio signals are low in the higher frequency range. With this in mind, the level $\alpha$ is set so as to be higher towards the higher frequency range having the low energy values, for reducing the number of bits allocated for the higher frequency range. Thus, in the first noise level setting means, the level $\alpha$ is set so as to be higher for the same energy value for the critical bands of higher frequencies.

Thus the present apparatus calculates the level $\alpha$ corresponding to the first allowable noise level and controls the level $\alpha$ so as to be higher for higher frequency bands. To this end, the output of the filter circuit 15 is supplied to the subtracter 16 adapted for finding the level $\alpha$ in the convolved region. The subtracter 16 is supplied with a permission function (a function expressing the masking level) for finding the level $\alpha$. The level $\alpha$ is controlled by increasing or decreasing the permission function, which is supplied from a function generating circuit 29.

The level $\alpha$ corresponding to the allowable noise level may be found from the following formula (1)

$$\alpha = S - (n - ai) \quad (1)$$

where i is a number given to the critical bands in the order of increasing frequencies.

In this formula (1), n and a are constants, with $a > 0$, S is the intensity of the Burke spectrum following convolution and $(n - ai)$ in formula (1) is the permission function. Since it is more advantageous to decrease the number of bits from the higher range with lesser energy amounts for the sake of decreasing the overall number of bits, as discussed above, the values n and a are set so that $n = 38$ and $a = 1$ in the present embodiment, whereby satisfactory encoding can be achieved without deterioration in the sound quality.

The level $\alpha$ found in this manner is transmitted to the division unit 17. The division unit 17 functions to deconvolve the level $\alpha$ in the convolved region. Thus, by this deconvolution, the masking spectrum can be obtained from the level $\alpha$. That is, this masking spectrum proves to be the allowable noise spectrum found from one band to another. Although deconvolution necessitates a complex processing operation, it is performed in the present embodiment with the use of the simplified division unit 17.

Figure 7:
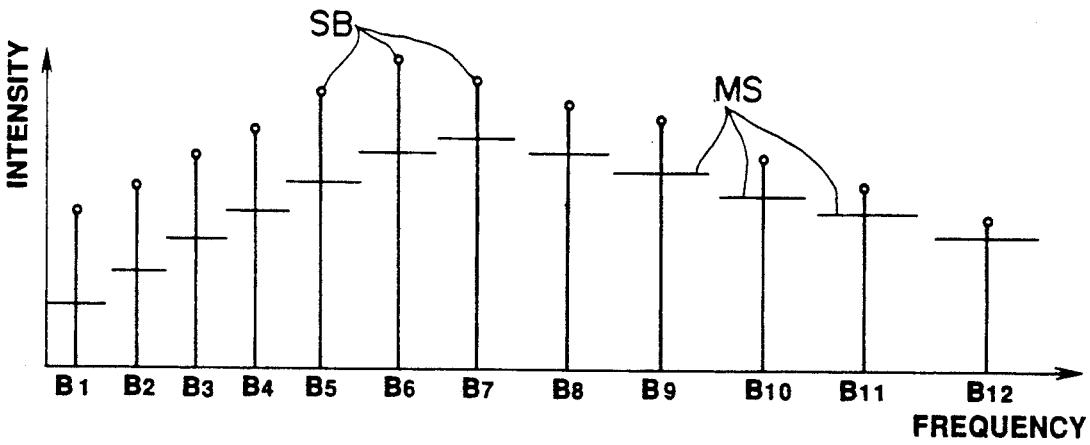
FIG. 7 is a chart for illustrating a masking spectrum.

The masking spectrum is transmitted to a subtracter 19 by means of synthesizing circuits 18 and 56. To the subtractor 19, the output of the sum detection circuit 14, that is, the Burke spectrum SB, is supplied by means of a delay circuit 21. Thus the masking spectrum and the Burke spectrum SB are processed by the subtractor 19 by a subtracting operation, whereby, as shown in FIG. 7, the Burke spectrum SB is masked at levels lower than the the level of the masking spectrum MS.

The output of the subtracter 19 is supplied to the quantization circuit 24 by means of a ROM 20. In the quantization circuit 24, the amplitude Am supplied thereto by means of the delay circuit 23 is quantized with a number of bits conforming with the output from the subtractor 19. In other words, the signal components of each frequency band are quantized with a number of bits allocated in accordance with the level difference between the energy of each critical band and the output of the synthesizing circuit 56. Meanwhile, the delay circuit 21 is provided for delaying the Burke spectrum SB from the sum detection circuit 14 in consideration of the delay in each circuit upstream of the synthesizing circuit 56, while the delay circuit 23 is provided for delaying the amplitude Am in consideration of the delay caused in each circuit upstream of the ROM 20. The ROM 20 stores data indicating the number of bits allocated for quantization in the quantization circuit 24 and outputs the data of the allocated number of bits conforming to the output of the subtracter 19.

Figure 8:
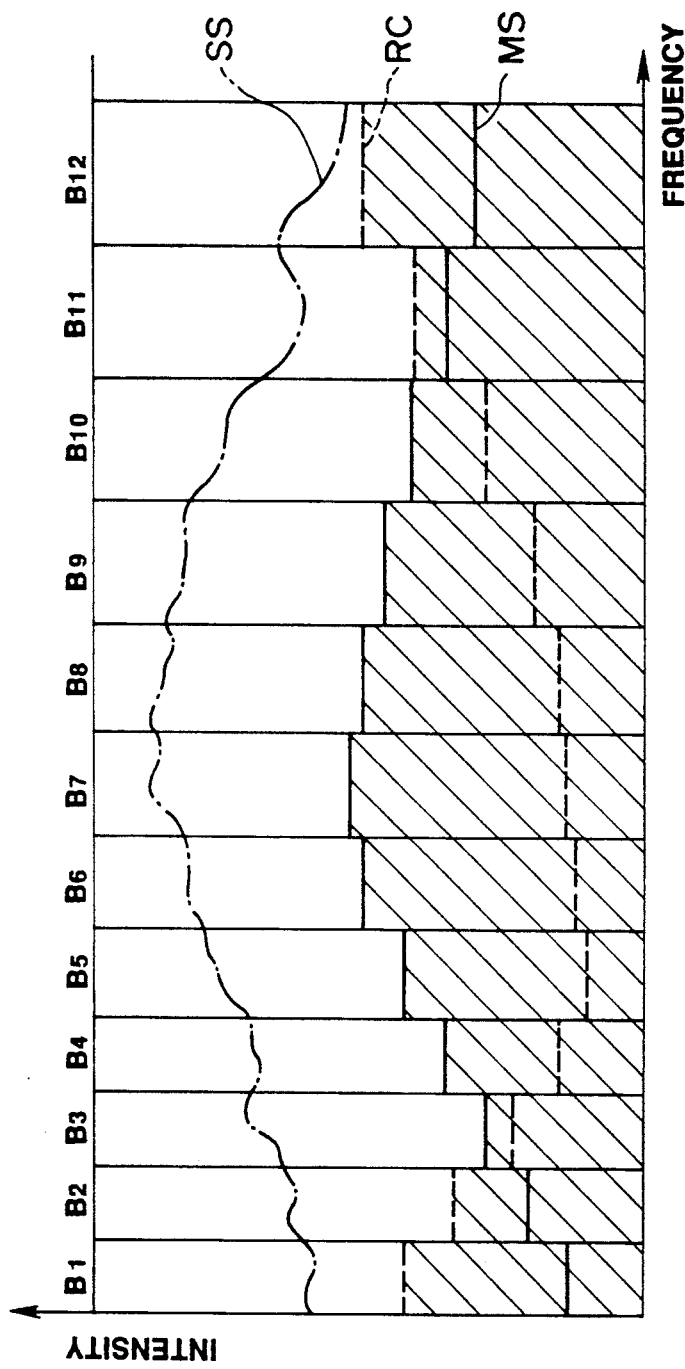
FIG. 8 is a chart for illustrating the synthesis of a minimum audibility curve and the masking spectrum in the FIG. 3 embodiment.

With reference also to FIG. 8, it is noted that, in the synthesis by the synthesizing circuit 18, the data indicating the so-called minimum audibility curve (equal loudness curve) RC, which represents the characteristics of the human auditory sense, from a minimum audibility curve generating circuit 22, and the masking spectrum MS, are synthesized. By synthesizing the minimum audibility curve RC and the masking spectrum MS in this manner, the allowable noise level may be defined as the upper boundary of an area indicated by the hatched lines in the drawing, so that the number of bits allocated to this area may be diminished. Meanwhile, in FIG. 8, the frequency range has been divided into the critical bands shown in FIG. 4 and the signal spectrum SS is also shown.

With the present digital signal encoding apparatus, the allowable noise level is increased and the allocated number of bits decreased towards higher frequencies with smaller amounts of energy, while the signal components are quantized with a number of bits which takes into account the masking of the signals on the frequency axis from one band to another, so that further bit reduction may be achieved, that is, the bit rate may be decreased.

Also, in the present embodiment, the number of bits allocated for quantization is determined in consideration of the above mentioned masking effect on the frequency axis, while the second allowable noise level of the band under consideration is set on the basis of the energies of the signals temporally adjacent to the band under consideration for quantization. In this manner, the number of bits allocated for quantization which takes into account the temporal masking effect on the time axis may be determined simultaneously. That is, the second allowable noise level is additionally set for the frequency band under consideration at the current time for which the first allowable noise level has been set in the first noise level setting means, so that temporal masking by signals lying at temporally adjacent earlier and later points on the time axis may also be taken into account. For this purpose, not only the output of the synthesizing circuit 18 but also the output of the synthesizing circuit 55 of the second noise level setting means is supplied to the synthesizing circuit 56.

In this manner, the level of temporal masking based on the energies of the signals lying at adjacent points in time with respect to the signal at the current time in the band under consideration is computed as the signal of the second allowable noise level and supplied to the synthesizing circuit 55, so that an allowable noise level by these temporally adjacent signals is formed by the synthesizing circuit 55.

For obtaining the second allowable noise level, the present apparatus is provided with the memory 51 adapted for writing/reading the output of the sum detection circuit 14 for every 512 samples, memory 52 similar to memory 51, coefficient multipliers 53, 54 and the synthesizing circuit 55. That is, if the time at which the output of memory 51 is obtained is regarded as the current time $T_0$, the timing of the output of the sum detection circuit 14 supplied to the memory 51 is a later point in time $T_{+1}$ which is temporally after the current time point $T_0$ (future time relative to $T_0$), while the timing of the output from the memory 52 is an earlier time point $T_{-1}$ temporally before the current time point $T_0$ (a past time relative to current time $T_0$).

The signal at the later time point $T_{+1}$, that is, the output of the sum detection circuit 14, is supplied to the coefficient multiplication unit 53. In the coefficient multiplication unit 53, the signal at the later time point $T_{+1}$ is multiplied by a multiplication coefficient which has been determined in consideration of the temporal masking effect by the signal in the band under consideration supplied at the later time point $T_{+1}$ to the unit 53 on the signal in the band under consideration at the current time point $T_0$(background masking). That is, the multiplication coefficient is set in consideration of the effects brought about at the synthesis circuits 55 and 56. If the signal at the later time point $T_{+1}$ is normalized to 1, the signal at the later time point $T_{+1}$ is multiplied by a multiplication coefficient $k_B$ corresponding to the level at which the backward masking by the signal at the later time point $T_{+1}$ acts on the signal at the current time point $T_0$. The signal at the earlier time point $T_{-1}$, that is the output from memory 52, is supplied to the coefficient multiplication unit 54. At the coefficient multiplication unit 54, the signal at the earlier time point $T_{-1}$ is multiplied by a multiplication coefficient determined in consideration of the temporal masking effect of the signal in the band under consideration at the current time point $T_0$ by the signal in the band under consideration supplied at the earlier time point $T_{-1}$ to the coefficient multiplication unit 54 (forward masking). Thus the multiplication coefficient is also determined to take the effect brought about at the synthesizing circuits 55 and 56 into account. If the signal at the earlier time point $T_{-1}$ is normalized, the signal at the earlier time point $T_{-1}$ is multiplied by a multiplication coefficient $k_F$ corresponding to the level at which the forward masking by the signal at the earlier time point $T_{-1}$ acts on the signal at the current time point $T_0$. The output of the coefficient multiplication units 53 and 54 are synthesized in the synthesizing circuit 55 into the above-mentioned second allowable noise level. The synthesizing circuit 55 adds the outputs of the coefficient multiplication units 53 and 54 together. The output of the synthesizing circuit 55 produced in this matter is supplied to the synthesizing circuit 56.

In the synthesizing circuit 56, the larger one of the outputs of the synthesizing circuit 55 or 18 is selected or, alternatively, the outputs of the circuits 55 and 18 are added together after multiplication by predetermined weighting coefficients. The latter synthesizing operation by addition may also be performed so that, in finding the second allowable noise level, the energies of the overall frequency bands are taken into account.

The above described minimum audibility curve synthesizing operation may be omitted in which case the minimum audibility curve generating circuit 22 and the synthesizing circuit 18 shown in FIG. 3 may be eliminated. Thus the output of the subtracter 16 may be transmitted directly to the synthesizing circuit 56 after deconvolution by the division circuit 17.

With the above described digital signal encoding apparatus, the first allowable noise level which takes the masking on the frequency axis into account is set by the first noise level setting means for the signals under consideration for quantization, at the same time that the second allowable noise level, which takes the temporal masking by signals temporally adjacent to the signals of the band under consideration into account, is also set by the second noise level setting means for the same signals under consideration for quantization. The number of bits allocated for quantization by the quantization circuit 24 is set from one band to another on the basis of these first and second allowable noise levels, to achieve greater bit reduction, or conversely, to lower the bit rate, without degrading the sound quality.

Figure 9:
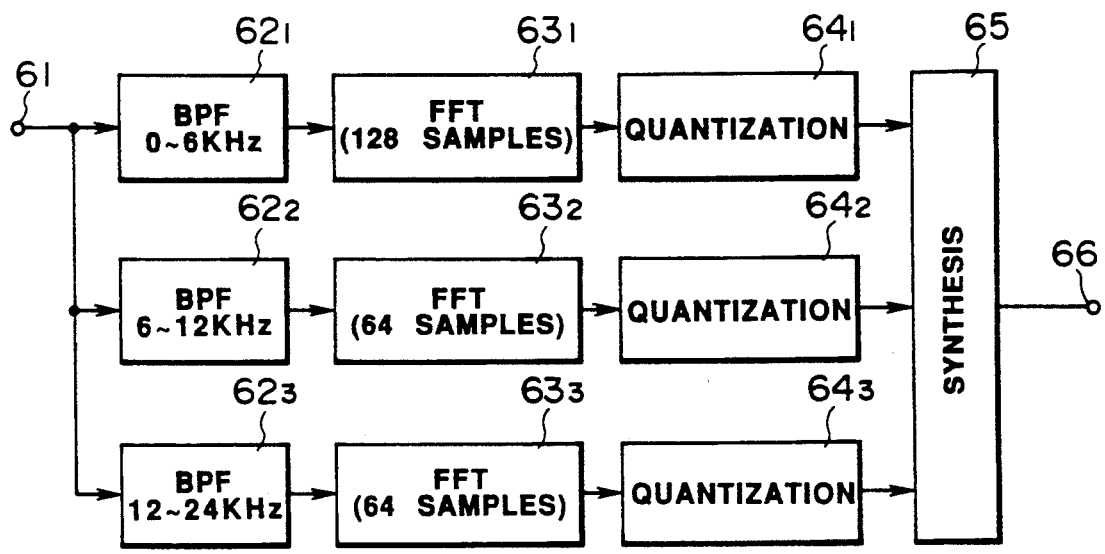
FIG. 9 is a block circuit diagram showing the construction of a modified embodiment.

The present invention may also be applied in a band-dividing and encoding apparatus, shown for example in FIG. 9, besides the apparatus for adaptive transform and encoding, shown for example in FIG. 3.

Figure 1:
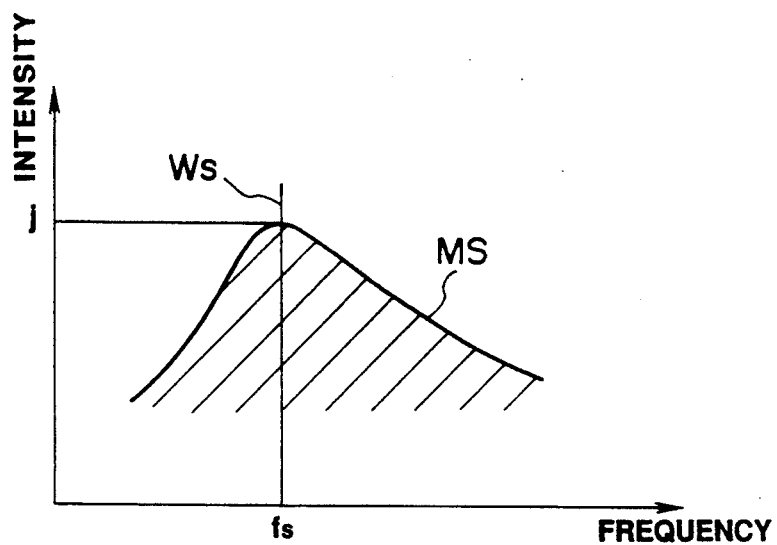
FIG. 1 is a chart showing the masking effect along the spectrum of audio signals.
Figure 2:
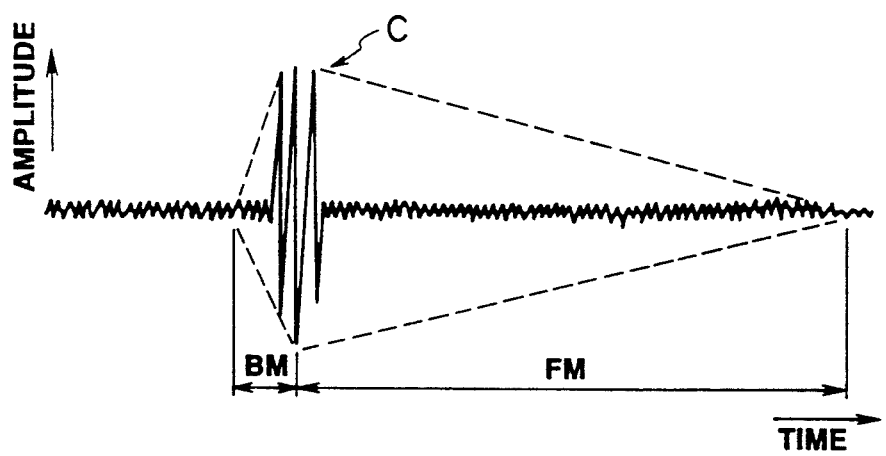
FIG. 2 is a chart for illustrating the temporal masking effect.

Referring to FIG. 9, audio signals on the time axis are supplied via input terminal 61 to bandpass filters (BPFs) $62_1$ to $62_3$. The BPF $62_1$ has a passband of 0 to 6 kHz for the input audio signals, the BPF $62_2$ has a passband of 6 to 12 kHz for such input signals and, finally, the BPF $62_3$ has a passband of 12 to 24 kHz for the input audio signals. The outputs of these BPFs are transmitted to fast Fourrier transform (FFT) circuits $63_1$ to $63_3$. In the FFT circuit $63_1$, FFT processing is performed for example for every 128 samples, whereas, in the FFT circuits $63_2$ and $63_3$, FFT processing is performed for example for every 64 samples. The outputs of these FFT circuits are transmitted to quantization circuits $64_1$ to $64_3$, similar to the circuitry downstream of the FFT circuit 11 in FIG. 3, so as to be processed similarly to the preceding embodiments. The outputs of the quantization circuits 64₁ to 64₃ are synthesized in a synthesizing circuit 65 and outputted at an output terminal 66. With the arrangement shown in FIG. 9, it is possible to achieve greater bit reduction, while minimizing deterioration in sound quality, similarly to the apparatus shown in FIG. 1.

Figure 10:
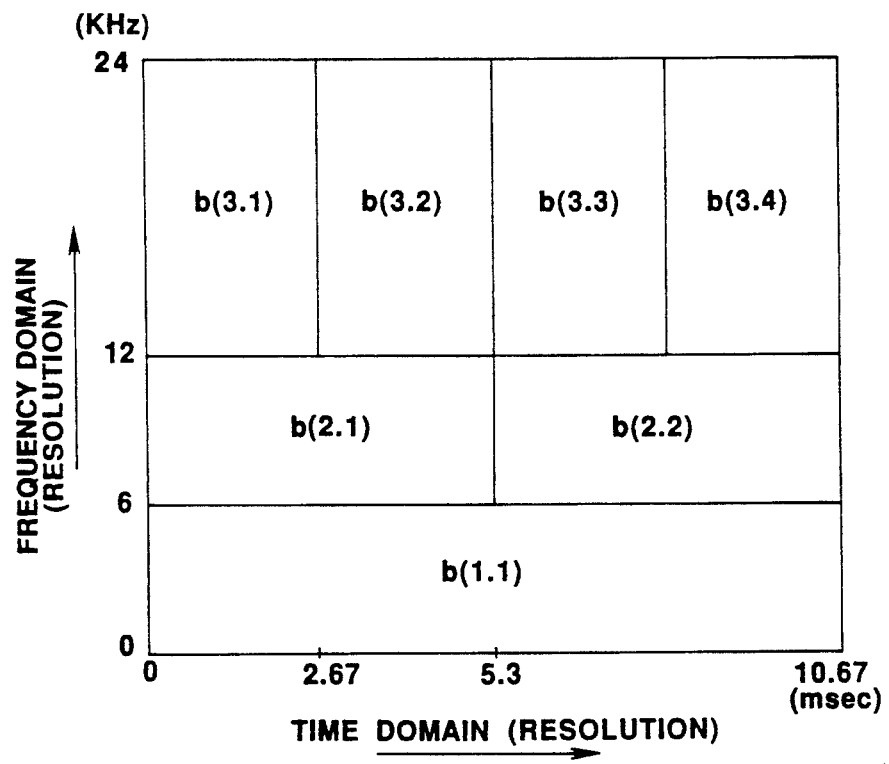
FIG. 10 is a chart for illustrating the resolution of the frequency domain and the time domain in the FIG. 9 3 embodiment.

FIG. 10 shows the resolution in the frequency domain and the time domain in the apparatus shown in FIG. 10, wherein a unit of processing by band division or fast Fourrier transform is shown and each block is designated by two parameters m and n as b(m, n), where m is the band number and n the time number. It is seen from FIG. 8 that, for the lower range of 0 to 6 kHz, each block in each frequency band has a time duration (time resolution) of 10.67 msec, and that, for the mid and higher frequency ranges of 6 to 12 kHz and 12 to 24 kHz, respectively, each block has a time duration of 5.3 msec and a time duration of 2.67 msec, respectively.

What is claimed is:

1. A digital signal encoding apparatus for encoding an input digital signal having an input frequency range, comprising:
   dividing means for dividing said input digital signal into respective signal components within a plurality of frequency bands within the input frequency range,
   first noise level setting means for setting a first allowable noise level for the respective signal components within each of said plurality of frequency bands based on energy levels of respective signal components occurring concurrently therewith and within at least one frequency band other than said each of said plurality of frequency bands,
   second noise level setting means for setting a second allowable noise level for the respective signal components within said each of said plurality of frequency bands based on energy levels of temporally adjacent signals in the same band as said respective signal components,
   synthesizing means for generating a synthesized allowable noise level for the respective signal components within said each of said plurality of frequency bands based on the first and second allowable noise levels set therefor by said first noise level setting means and said second noise level setting means, respectively, and
   quantizing means for quantizing the respective signal components of said each of said plurality of frequency bands with a bit number based on said synthesized allowable noise level generated therefor.

2. A digital signal encoding apparatus according to claim 1, wherein said dividing means is operative to divide the input frequency range of said input digital signal into said plurality of frequency bands so that a bandwidth of at least a first one of said plurality of frequency bands is selected to be broader than the bandwidth of a second one of said plurality of frequency bands including frequencies lower than frequencies within the first frequency band.

3. A digital signal encoding apparatus according to claim 1, wherein said dividing means includes transform coding means for transform coding a predetermined number of samples of said input digital signal to generate co-efficient data and means for generating said respective signal components based on said coefficient data.

4. A digital signal encoding apparatus according to claim 3, wherein said dividing means is operative to divide said input digital signal into respective signal components within a plurality of critical bands.

5. A digital signal encoding apparatus according to claim 1 wherein said dividing means is operative to generate said respective signal components based on coefficient data obtained upon an orthogonal transformation of an audio signal supplied as said input digital signal.

6. A digital signal encoding apparatus according to claim 1 wherein said dividing means is operative to generate said respective signal components based on amplitude value information derived from said coefficient data.

7. A digital signal encoding apparatus according to claim 5 or 6 further comprising band-dividing filter means for dividing said audio signal into respective audio signal components within predetermined frequency ranges and transform means for producing said coefficient data through an orthogonal transformation of said respective audio signal components.

8. A digital signal encoding apparatus according to claim 1 wherein said first noise level setting means comprises convolution means for carrying out a convolution of said energy levels of the respective signal components within each frequency band and weighting means for carrying out a weighting function by according respective weighting values to the convoluted energy levels in each of said plurality of frequency bands such that the convoluted energy levels of a first one of said each of said plurality of frequency bands is accorded a greater weighting value than that accorded to the convoluted energy levels of a second one of said each of said plurality of frequency bands including signal frequencies lower than those included in the first frequency band.

9. A digital signal encoding apparatus according to claim 1 wherein the first and second noise level setting means are operative to set the first and second allowable noise levels, respectively, at least on the basis of a masking effect of the signals in each frequency band.

10. A digital signal encoding apparatus according to claim 1 wherein said first noise level setting means is operative to set the first allowable noise level at least on the basis of an equal loudness function of each of said plurality of frequency bands.

11. A digital signal encoding apparatus according to claim 2, wherein said dividing means is operative to divide the input frequency range of said input digital signal into said plurality of frequency bands so that the bandwidth of a frequency band thereof including the highest frequencies of said input frequency range is selected to be broader than those of said plurality of frequency bands including lower frequencies of said input frequency range.

12. A digital signal encoding apparatus for encoding an input digital signal having an input frequency range, comprising:
   dividing means for dividing said input digital signal into respective signal components within a plurality of frequency bands within the input frequency range,
   first noise level setting means for setting a first allowable noise level for the respective signal components within each of at least some of said plurality of frequency bands based on energy levels of respective frequency components occurring concurrently therewith and within at least one frequency band other than said each of said plurality of frequency bands, second noise level setting means for setting a second allowable noise level for the respective signal components within said each of said at least some of said plurality of frequency bands based on energy levels of temporally adjacent signals in the same band as said respective signal components, synthesizing means for generating a synthesized allowable noise level for the respective signal components within said each of said at least some of said plurality of frequency bands based on the first and second allowable noise levels set therefor by said first noise level setting means and said second noise level setting means, respectively, and quantizing means for quantizing the respective signal components of said each of said at least some of said plurality of frequency bands with a bit number based on said synthesized allowable noise level generated therefor.

* * * * *